(12) United States Patent
Wala

(10) Patent No.: US 9,250,746 B2
(45) Date of Patent: Feb. 2, 2016

(54) POSITION CAPTURE INPUT APPARATUS, SYSTEM, AND METHOD THEREFOR

(76) Inventor: Shafa Wala, North Oaks, MN (US)

(*) Notice: Subject to any disclaimer, the term of this patent is extended or adjusted under 35 U.S.C. 154(b) by 0 days.

(21) Appl. No.: 13/046,452

(22) Filed: Mar. 11, 2011

(65) Prior Publication Data

US 2011/0225534 A1    Sep. 15, 2011

Related U.S. Application Data

(60) Provisional application No. 61/313,554, filed on Mar. 12, 2010.

(51) Int. Cl.
| | | |
|---|---|---|
| *G06F 3/0482* | (2013.01) | |
| *G06F 3/0484* | (2013.01) | |
| *G06F 1/16* | (2006.01) | |
| *G06F 3/00* | (2006.01) | |
| *G06F 3/01* | (2006.01) | |
| *G06F 3/041* | (2006.01) | |
| *G06F 3/042* | (2006.01) | |

(52) U.S. Cl.
CPC ............ *G06F 3/0425* (2013.01); *G06F 1/163* (2013.01); *G06F 3/005* (2013.01); *G06F 3/012* (2013.01); *G06F 3/016* (2013.01); *G06F 3/0418* (2013.01); *G06F 3/04842* (2013.01); *G06F 3/017* (2013.01); *G06F 2203/014* (2013.01)

(58) Field of Classification Search
CPC ......... G06F 1/163; G06F 3/002; G06F 3/012; G06F 3/04842; G06F 3/04817; G06F 3/0482; G06F 21/83; G06F 3/04847; G06F 3/04892; G06F 1/1649; G06F 2203/0381; G06F 2203/04809; G06F 3/0426; G06F 3/0425; G06F 3/005; H04N 21/4223
USPC ............................. 715/773; 345/156; 351/41
See application file for complete search history.

(56) References Cited

U.S. PATENT DOCUMENTS

| | | | | |
|---|---|---|---|---|
| 4,516,157 | A * | 5/1985 | Campbell | ...................... 348/158 |
| 5,528,263 | A * | 6/1996 | Platzker et al. | ............... 345/156 |
| 6,115,482 | A * | 9/2000 | Sears | ................... G09B 21/006 |
| | | | | 348/62 |
| 6,431,711 | B1 * | 8/2002 | Pinhanez | ......................... 353/69 |
| 6,624,833 | B1 * | 9/2003 | Kumar et al. | ................. 715/863 |
| 6,690,357 | B1 * | 2/2004 | Dunton et al. | ................ 345/158 |
| 6,943,774 | B2 * | 9/2005 | Horiki | ............................ 345/158 |

(Continued)

OTHER PUBLICATIONS

Camillo, Virtual Keyboards, Nov. 23, 1999.*

*Primary Examiner* — Nicholas Ulrich
(74) *Attorney, Agent, or Firm* — Shewchuk IP Services, LLC; Jeffrey D. Shewchuk (57) ABSTRACT

According to various embodiments, a position capture input system uses a camera to capture an image of a displayed graphical user interface that may be partially obstructed by an object, such as a user's hand or other body part. The position capture input system also includes a software component that causes a computing device to compare the captured image with a displayed image to determine which portion, if any, of the graphical user interface is obstructed. The computing device can then identify any user interface elements with which the user is attempting to interact. The position capture input system may also include an accelerometer or accelerometers for detecting gestures performed by the user to, for example, select or otherwise interact with a user interface element. The position capture input system may also include a haptic feedback module to provide confirmation, for example, that a user interface element has been selected.

21 Claims, 11 Drawing Sheets

(56) References Cited

U.S. PATENT DOCUMENTS

| | | | |
|---|---|---|---|
| 8,162,486 B2* | 4/2012 | Borger et al. | 353/69 |
| 8,199,106 B2* | 6/2012 | Sugaya et al. | 345/157 |
| 2003/0004678 A1* | 1/2003 | Zhang | G06F 3/0425 |
| | | | 702/152 |
| 2007/0030442 A1* | 2/2007 | Howell et al. | 351/158 |
| 2009/0096746 A1* | 4/2009 | Kruse et al. | 345/156 |
| 2009/0168027 A1* | 7/2009 | Dunn et al. | 353/28 |
| 2009/0262125 A1* | 10/2009 | Swaminathan et al. | 345/581 |
| 2010/0061579 A1* | 3/2010 | Rickards et al. | 381/375 |
| 2010/0199232 A1* | 8/2010 | Mistry et al. | 715/863 |

* cited by examiner

POSITION CAPTURE INPUT APPARATUS, SYSTEM, AND METHOD THEREFOR

CROSS-REFERENCE TO RELATED APPLICATION

This application claims the benefit of priority to provisional application 61/313,554, filed Mar. 12, 2010.

TECHNICAL BACKGROUND

The disclosure relates generally to computer input devices. More particularly, the disclosure relates to computer input devices that are sensitive to motion.

BACKGROUND

Since the 1980's, the mouse has been the default input device for navigation on personal computers. The power of the graphical user interface (GUI) was unleashed by the mouse's ability to open windows, click on icons, and manipulate objects on screen. These abilities opened the door for companies to develop operating systems that no longer required the typing of commands to access content and instead allowed novice users to "point and click" to run applications. In the 1990's, some mice began to incorporate scroll wheels, which added new functionality in order to allow users to navigate multipage documents and web pages, which were becoming more common.

In the early 21st century, a new direction of computing began to take place. The Internet and wireless technologies have allowed hardware manufacturers to start integrating similar components. In addition, computer display technologies have moved away from cathode ray tubes in favor of flat screen devices, such as liquid crystal display (LCD) or plasma screens. Today, both a home desktop pc and a television can use an LCD screen or similar flat screen display to render an image. The resolutions required for the computer and for the High-Definition (HD) content for TV viewing are now on par with one another, and having an LCD TV and an LCD monitor would be redundant. Additionally, as we can see with netbooks, computer components have become both inexpensive and compact. LCD TV manufacturers like Samsung, Sony, and Panasonic, now ship models with basic processing power and connectivity to support web enabled content like Netflix streaming, Yahoo widgets, web browsers, etc. A user can surf the net and perform all the tasks that he or she would be able to from a personal computer (PC) or laptop, without being constrained to a desktop environment. However, for anyone that has any experience using their TV to surf the net there is one major obstacle that arises. Using a remote control to navigate a content-rich environment is very difficult. Even "intelligent" devices like the Nintendo Wii remote are fairly difficult to use in comparison to the mouse.

A number of issues have made it difficult to use the mouse for navigation outside of the PC environment. First, a mouse requires a surface to be used. In fact a desktop is called a desktop because it uses a desk as a platform to be used on. Second, using a mouse to input text is very difficult since each letter needs to be clicked and the letters of a virtual keyboard are spaced apart. As a result, "typing" involves significantly more hand movement than is involved in a physical keyboard. Third, since a mouse is bound by a two-dimensional surface in that it moves in two dimensions, it is not useful for navigating in a three-dimensional environment as depth would now require an additional input. A comprehensive solution to the shortcomings of the mouse would be a device that requires no surface, can be used to input text in a more user-friendly way, and has the capability of navigating in a three-dimensional environment.

SUMMARY OF THE DISCLOSURE

According to various embodiments, a position capture input system uses a camera to capture an image of a displayed graphical user interface that may be partially obstructed by an object, such as a user's hand or other body part. The position capture input system also includes a software component that causes a computing device to compare the captured image with a displayed image to determine which portion, if any, of the graphical user interface is obstructed. The computing device can then identify any user interface elements with which the user is attempting to interact. The position capture input system may also include an accelerometer or accelerometers for detecting gestures performed by the user to, for example, select or otherwise interact with a user interface element. The position capture input system may also include a haptic feedback module to provide confirmation, for example, that a user interface element has been selected.

In one embodiment, a position capture input system includes a first camera configured to capture an image of a graphical user interface from a perspective of a user. The graphical user interface comprises a plurality of user interface elements. A computing device is in communication with the first camera and is configured to receive the captured image and compare the captured image to a displayed image generated by the computing device. Based on the comparison between the captured image and the displayed image, the computing device determines a position of an obstruction relative to the graphical user interface. Based on the position of the obstruction relative to the graphical user interface, the computing device determines whether the user is interacting with a user interface element of the graphical user interface. Other embodiments are directed to methods and computer-readable storage media, other than signals, that may be used in connection with the position capture input system.

DESCRIPTION OF VARIOUS EMBODIMENTS

According to various embodiments, a position capture input system uses a camera to capture an image of a displayed graphical user interface that may be partially obstructed by an object, such as a user's hand or other body part. The position capture input system also includes a software component that causes a computing device to compare the captured image with a displayed image to determine which portion, if any, of the graphical user interface is obstructed. The computing device can then identify any user interface elements with which the user is attempting to interact. The position capture input system may also include an optional accelerometer or accelerometers for detecting gestures performed by the user to, for example, select or otherwise interact with a user interface element. In some embodiments, the position capture input system includes a haptic feedback module that may provide confirmation, for example, that a user interface element has been selected.

The following description of various embodiments implemented in a computing environment is to be construed by way of illustration rather than limitation. This description is not intended to limit the scope of the disclosure or the applications or uses of the subject matter disclosed in this specification. For example, while various embodiments are described as being implemented in a computing environment, it will be appreciated that the principles of the disclosure are applicable to user interface devices operable in other environments, such as gaming consoles or multimedia devices.

In the following description, numerous specific details are set forth in order to provide a thorough understanding of various embodiments. It will be apparent to one skilled in the art that some embodiments may be practiced without some or all of these specific details. In other instances, well-known components and process steps have not been described in detail. Various embodiments may be described in the general context of processor-executable instructions, such as program modules, being executed by a processor. Generally, program modules include routines, programs, objects, components, data structures, etc., that perform particular tasks or implement particular abstract data types. Certain embodiments may also be practiced in distributed processing environments in which tasks are performed by remote processing devices that are linked through a communications network or other data transmission medium. In a distributed processing environment, program modules and other data may be located in both local and remote storage media, including memory storage devices.

Figure 1:
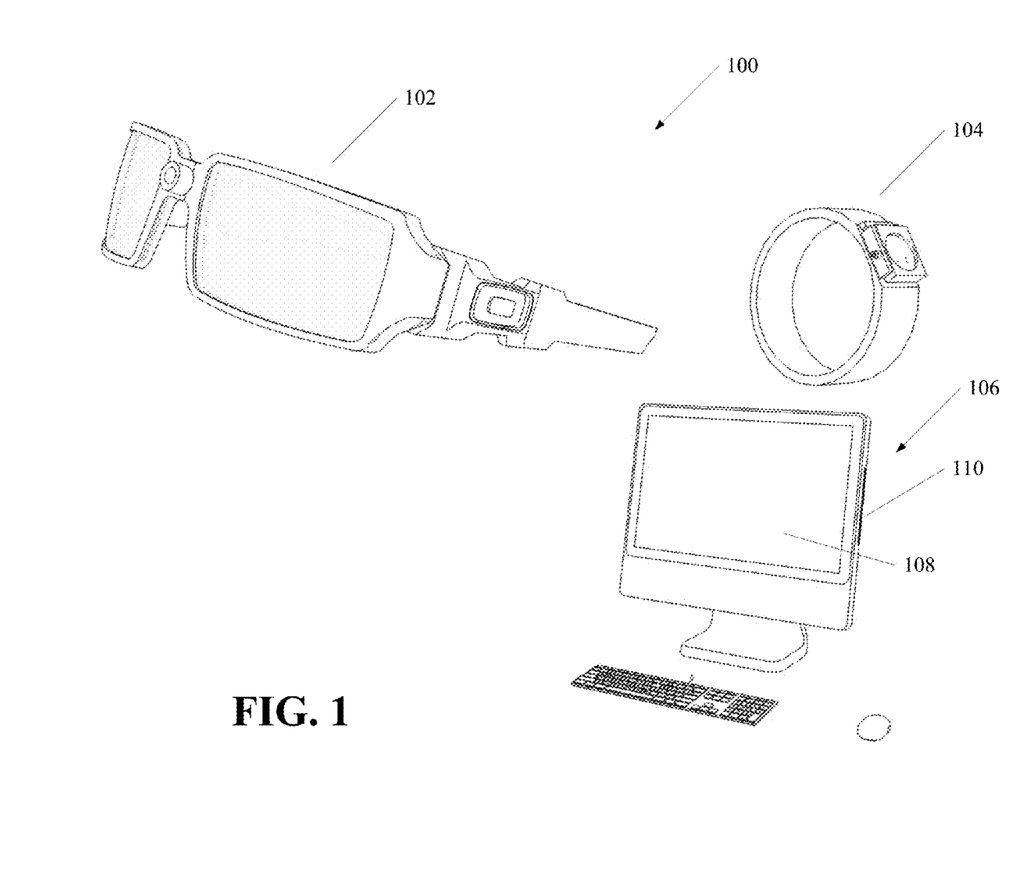
FIG. 1 is a system diagram illustrating a position capture input system according to one embodiment.

Referring now to the drawings, FIG. 1 is a system diagram illustrating a position capture input system 100 according to one embodiment. In the embodiment shown in FIG. 1, the position capture input system 100 includes an optical component 102 that uses a camera built in to a pair of glasses that a user wears. While not required, the user may wear an optional wrist device 104 to detect motion of the user's hand. A computing device 106 incorporates a software component that uses information obtained from the optical component 102 and from the optional wrist device 104, if present, to allow the user to navigate a graphical user interface. In the embodiment shown in FIG. 1, a display device 108 is formed integrally with the computing device 106. In other embodiments, however, the display device 108 may be a separate component from the computing device 106.

The computing device 106 is typically configured to operate with one or more types of processor readable media. Processor readable media can be any available media that can be accessed by the computing device 106 and includes both volatile and nonvolatile media, removable and non-removable media. By way of example, and not limitation, processor readable media may include storage media and communication media. Storage media includes both volatile and nonvolatile, removable and nonremovable media implemented in any method or technology for storage of information such as processor-readable instructions, data structures, program modules, or other data. Storage media includes, but is not limited to, RAM, ROM, EEPROM, flash memory or other memory technology, CD-ROM, digital versatile discs (DVDs) or other optical disc storage, magnetic cassettes, magnetic tape, magnetic disk storage or other magnetic storage devices, or any other medium that can be used to store the desired information and that can be accessed by the computing device 106, for example, via a media drive 110. Communication media typically embodies processor-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also intended to be included within the scope of processor-readable media.

Figure 2:
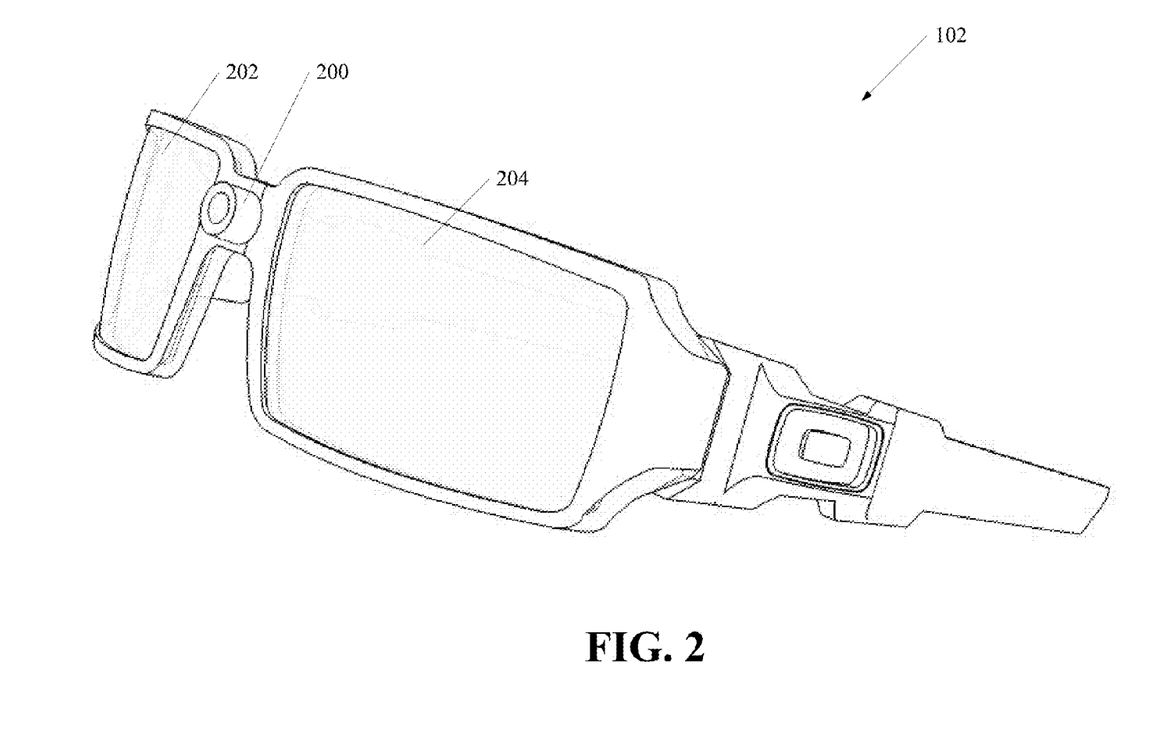
FIG. 2 is a perspective view of one component of the position capture input system of FIG. 1.

FIG. 2 is a perspective view of the optical component 102. The optical component 102 incorporates a camera 200, which may be located between a pair of lenses 202, 204. The camera 200 may be implemented as a low resolution, monochrome camera to reduce the amount of information that is transmitted to the computing device 106. Alternatively, the camera 200 may be implemented as a higher resolution or color camera, for example, if bandwidth is not a significant concern. In some embodiments, the optical component 102 may incorporate multiple cameras 200, for example, to provide stereoscopic position capture capabilities. In such embodiments, the cameras may be positioned above, below, or to the side of the respective lenses 202, 204.

The lenses 202, 204 may be manufactured from any suitable material, including, for example, glass or plastic. In some embodiments, the lenses 202, 204 may not provide any functionality. Indeed, certain embodiments may omit the lenses 202, 204 or may replace them with a single visor-like structure. On the other hand, in other embodiments, the lenses 202, 204 may provide the user with the ability to perceive the appearance of three-dimensional images and user interfaces generated by the display device 108. This capability can be realized in a number of ways that are known in the art. For example, the lenses 202, 204 may be of different colors, e.g., red and blue. Alternatively, the lenses 202, 204 may be of a similar color, but different polarizations. As yet another example, the lenses 202, 204 may employ active rather than passive components to realize three-dimensional functionality. For example, the lenses 202, 204 may incorporate LCD elements that selectively obscure the vision out of the user's eyes in rapid succession, thereby filtering the optical input received by each eye by time division. Images displayed on the display device 108 may be synchronized with the activation of the LCD elements in the lenses 202, 204 to create the illusion of three-dimensional perception.

Figure 3:
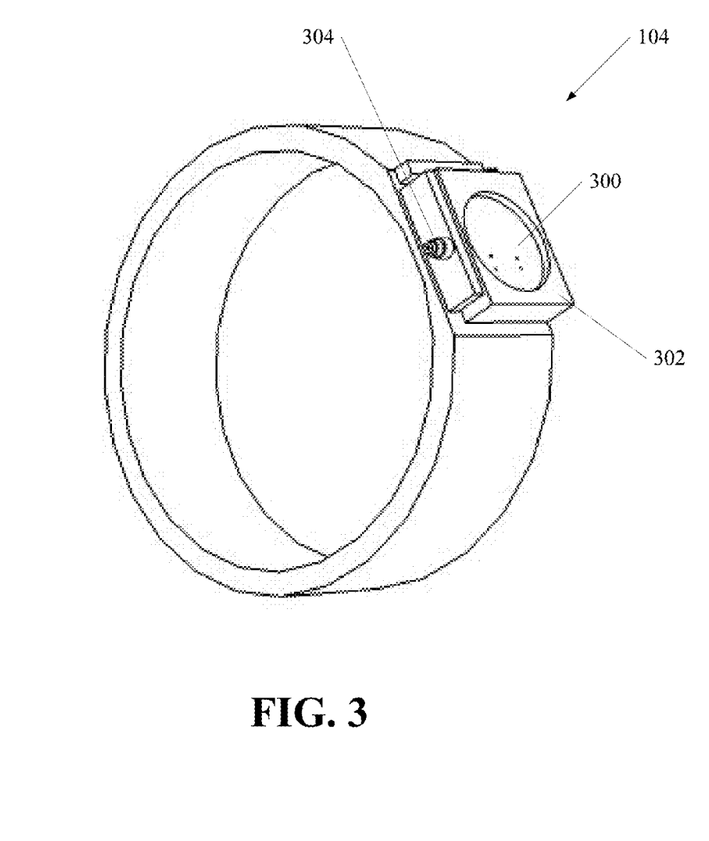
FIG. 3 is a perspective view of another component of the position capture input system of FIG. 1.

FIG. 3 is a perspective view of an example implementation of the wrist device 104. The wrist device 104 includes an accelerometer 300 that senses movement of the user's wrist. In some embodiments, the wrist device 104 may incorporate multiple accelerometers 300 for sensing movement of the user's wrist in multiple dimensions. In this way, the wrist device 104 can detect gestures performed by the user, e.g., for selecting a user interface element or otherwise interacting with a graphical user interface. The wrist device 104 also includes a wireless transceiver (not shown) for transmitting information collected by the accelerometer or accelerometers 300 to the computing device 106. The wireless transceiver may also receive data from the computing device 106, such as data confirming that a user interface element has been selected. While not required, the wrist device 104 may also incorporate a haptic feedback module 302. The haptic feedback module 302 may be implemented, for example, using an eccentric motor that generates a vibration when it is energized. In some embodiments, when the wrist device 104 receives confirmation from the computing device 106 that a user interface element has been selected, the haptic feedback module 302 is activated to provide feedback to the user. The haptic feedback module 302 may also be activated in response to other events, such as, for example, hovering over a user interface element that can be selected. The wrist device 104 also includes a calibration button 304, which can be actuated by the user to initiate a calibration mode as described below in connection with FIGS. 4-6.

The position capture input system 100 can be used with a variety of systems. In some embodiments, the computing device 106 is implemented using a conventional personal computer (PC) with an attached display device 108. In such embodiments, the computing device 106 communicates with the optical component 102 and with the wrist device 104 using a wireless communication link established through a wireless transceiver that is either connected to the PC via, for example, a USB port or integrated in the PC. The computing device 106 executes software that can use the resources of the PC to navigate either an existing user interface or a user interface that is generated to exploit enhanced functionality of the position capture input system 100.

Alternatively, the computing device 106 may be implemented using a television or display, such as a liquid crystal display (LCD) device that has limited or no processing power. In such embodiments, an additional hardware component can be connected to the display to process information that is collected by the position capture input system 100. This hardware component (not shown) essentially transforms the attached display into a computing device that allows widgets and browsers to be installed and used with predefined graphical user interfaces that are generated to exploit enhanced functionality of the position capture input system 100

Figure 4:
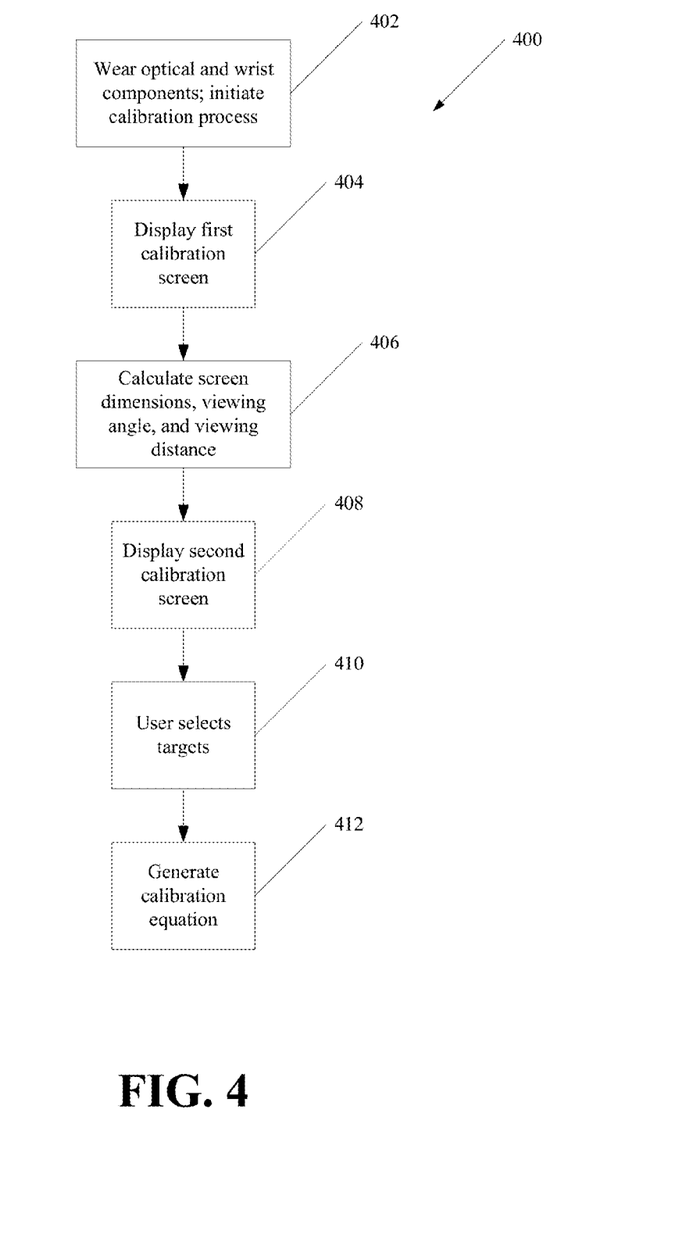
FIG. 4 is a flow diagram illustrating a method of calibrating the position capture input system of FIG. 1.
Figure 5:
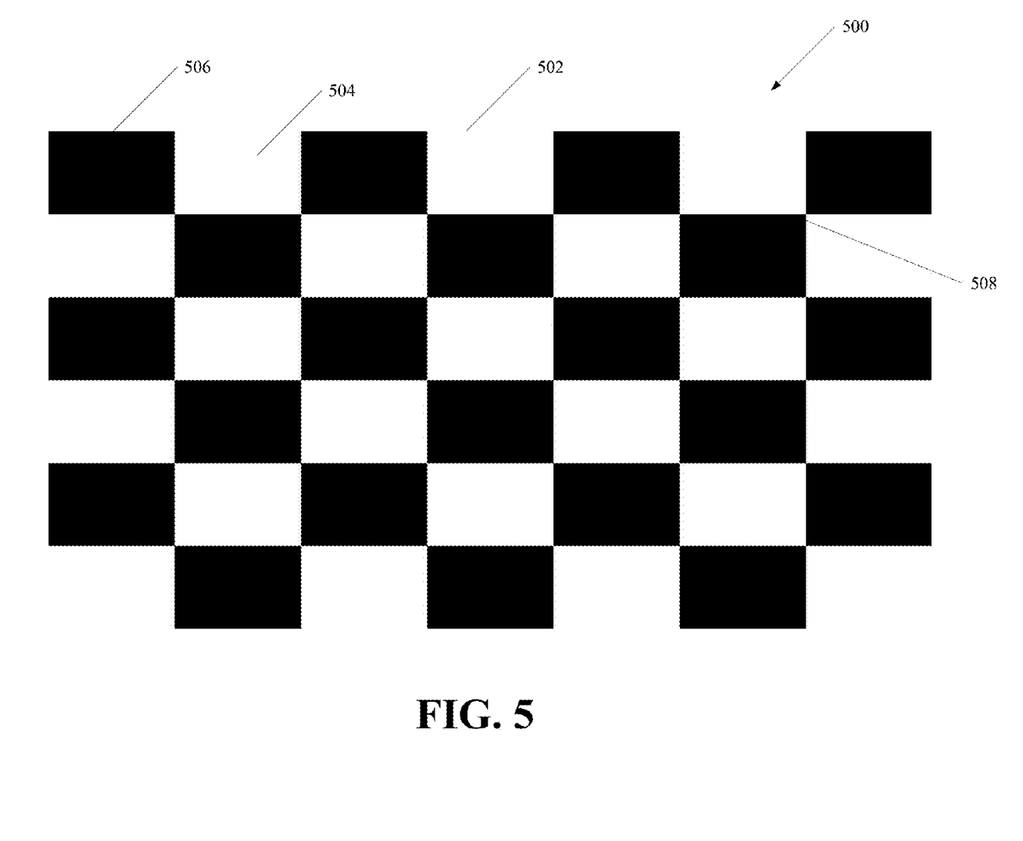
FIG. 5 is an example calibration screen image for use in connection with the calibration method of FIG. 4.

As disclosed above in connection with FIG. 3, the calibration button 304 can be actuated to initiate a calibration process. Calibrating the position capture input system 100 promotes accurate determination of the position of an obstruction relative to a displayed graphical user interface. FIG. 4 is a flow diagram illustrating an example method 400 of calibrating the position capture input system 100. First, the user wears the optical component 102 and the wrist device 104 and pushes the calibration button 304 at a step 402. As the user looks at the display device 108, which displays a first calibration screen image with a black and white checkerboard background at a step 404. FIG. 5, which is described more fully below, illustrates an example first calibration screen image 500.

Figure 6:
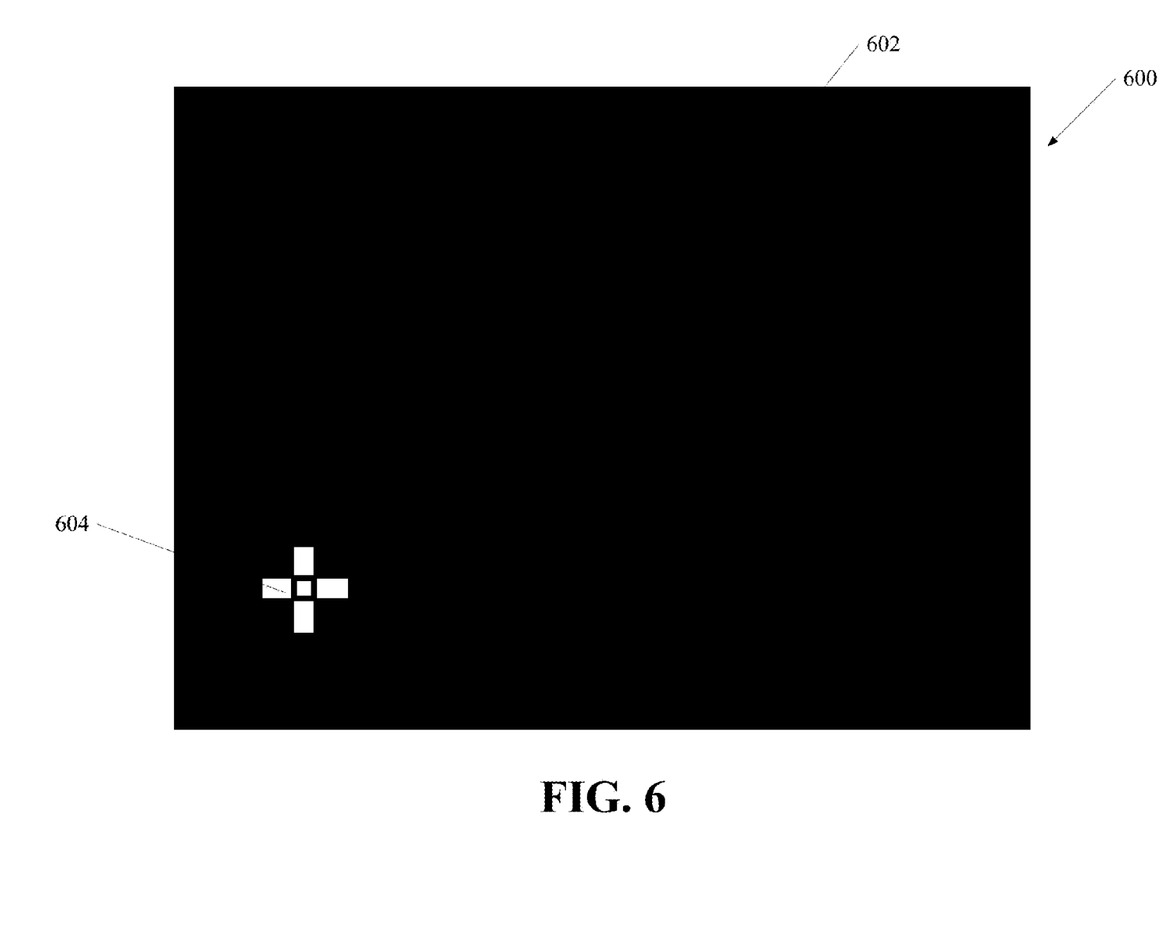
FIG. 6 is an example screen display for use in calibrating the position capture input system of FIG. 1 according to the method depicted in FIG. 4.

After those parameters are set at a step 406, the display device displays a second calibration screen image at a step 408. FIG. 6, which is described more fully below, illustrates an example second calibration screen image, which includes a sequence of targets displayed at various locations on the screen. The user taps on the targets at a step 410. The second calibration screen image is used to generate a calibration equation at a step 412 to increase input accuracy.

FIG. 5 is an example calibration screen image 500 for use in connection with the calibration method of FIG. 4. The calibration screen image 500 includes a checkerboard pattern 502 consisting of white rectangles 504 and black rectangles 506 that intersect at intersection points 508. Using the intersection points 508, the frame of the calibration screen image 500 itself, or both, the computing device 106 produces a special adjusted view, or homography, of the perspective view of the viewer or camera 200. Perspective transformation equations that produce this homography can then be applied to the pixels of the feed from the camera 200 to produce an unscaled homography. Once the camera feed image frame is scaled using pixel interpolation methods, the camera feed image frame and the monitor output image frame can be compared using image registration techniques, other statistical methods, or both. Edge detection techniques can facilitate this process. Areas of the image that do not show a significant degree of correlation can be identified as an obstruction.

FIG. 6 is an example second calibration screen image 600 for use in calibrating the position capture input system 100 according to step 408 of the method 400. The calibration screen image 600 comprises a dark or black background 602. A light or white target 604, such as a bull's eye or cross, is displayed on the background 602. Additional targets 604 are sequentially displayed at various points on the background 602. The user then points at each of the targets 604 in turn and clicks on the targets 604 by tapping them at step 410 of FIG. 4. The accelerometer or accelerometers 300 in the wrist device 104 recognizes that a click is being performed and associates the click with the position of the user's finger. The software reads the position of the user's finger and hand as an obstruction. An obstruction is defined as a variance between the visual information that is being outputted to the display and the visual information being received from the camera 200 in the optical component 102. If a hand is between the display device 108 and the camera 200, which is located in the optical component 102 at the viewing position of the user, then the software recognizes and records what the user perceives as their finger or hand position in relation to the screen. At step 412 of FIG. 4, the software generates and uses a calibration equation to increase input accuracy for the user.

Figure 7:
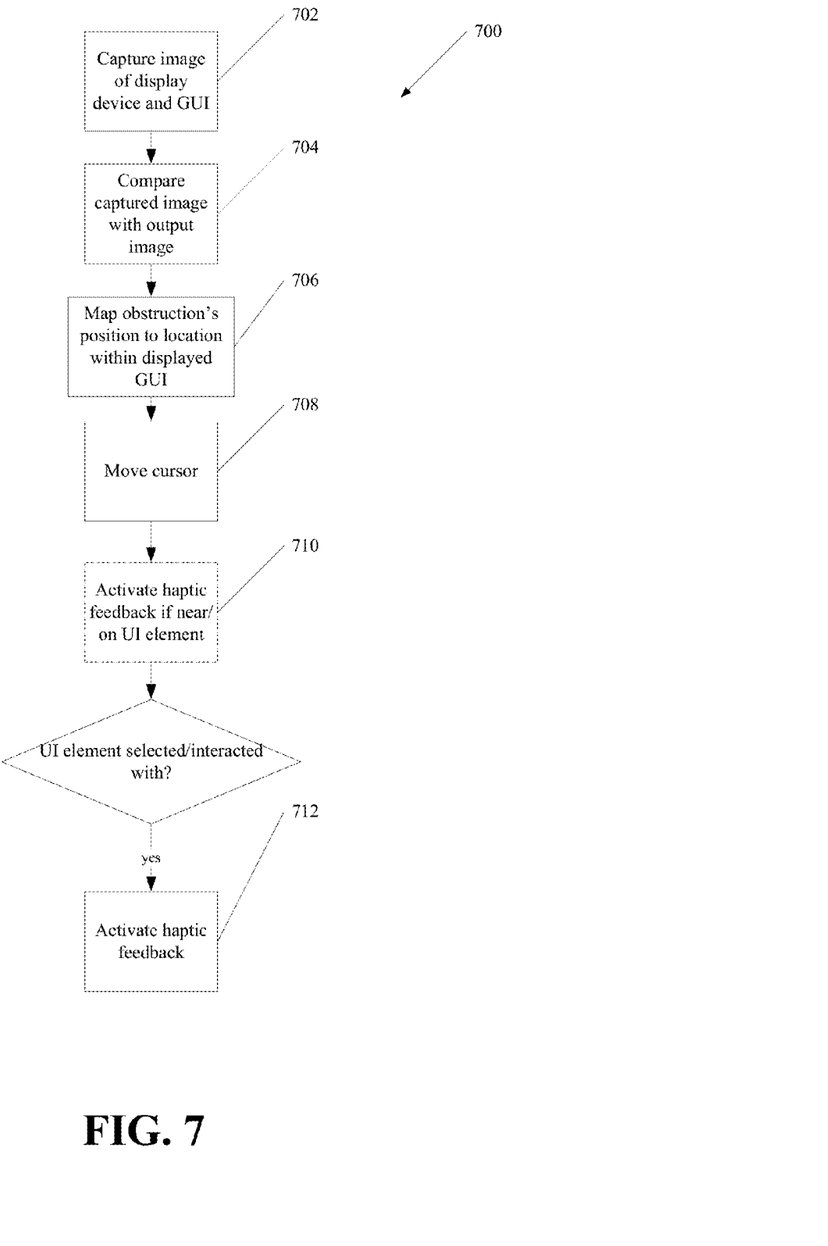
FIG. 7 is a flow diagram illustrating an example method of detecting a user's hand position relative to a graphical user interface according to another embodiment.

Once calibration is complete, the user can navigate an existing or custom graphical user interface by pointing and tapping in the space between their eyes/camera and the display. FIG. 7 is a flow diagram illustrating an example method 700 of detecting a user's hand position relative to a graphic user interface according to another embodiment. At a step 702, the camera 200 in the optical component 102 captures an image of the display device 108, which displays a graphical user interface. At a step 704, the captured image is then compared to an output image that is outputted by the computing device 106 using the display device 108. An object, such as a user's hand, that is present in the captured image but not in the output image is interpreted as an obstruction. Using the calibration of the position capture input system 100 with the proper homography of the display device 108, the computing device 106 then maps the position of the obstruction to a location within the displayed graphical user interface at a step 706. At a step 708, the computing device 106 then moves a cursor to the mapped location, which may be proximate or occupied by a user interface element, such as an icon, window, button, scroll bar, or other widget. If the mapped location is proximate or occupied by a user interface element, the computing device 106 may send a signal to the wrist device 104 to activate the haptic feedback module at an optional step 710. In this way, the user can be alerted that a user interface element can be interacted with. In addition, the computing device 106 may also cause the haptic feedback module to be activated at an optional step 712 if the computing device 106 determines that the user has selected or otherwise interacted with a user interface element. As disclosed above, the computing device 106 may determine that the user has interacted with a user interface element based on data received from the wrist device 104. Alternatively, the computing device 106 may make this determination based on data received from the optical component 102, e.g., if images captured by the camera 200 indicate that the user is performing a gesture, such as tapping.

In some embodiments, the software may be capable of recognizing an obstruction as a hand and may be capable of recognizing portions of an obstruction as fingers. Such embodiments may provide the ability to perform more complex navigation using gestures, as the user can use multiple fingers and hand gestures to navigate. Certain embodiments may also allow the user to use both hands to navigate the graphical user interface. For example, a virtual keyboard may be displayed using the display device 108, and the user may be able to interact with the virtual keyboard using both hands.

In some embodiments, the position capture input system 100 can be calibrated on an ongoing basis, in addition to during an initial calibration procedure. In such embodiments, the display device 108 may periodically display a calibration screen image to accommodate for the user changing perspective or moving. The frequency with which this calibration screen image is displayed is desirably selected to avoid overuse of computing resources. The calibration screen image may be displayed for a brief duration such that the camera 200 can capture the image of the calibration screen image, but a human cannot perceive the calibration screen image. In this way, the ongoing calibration procedure does not interfere with the user's experience of the graphical user interface. Alternatively, the ongoing calibration procedure may make use of on-screen artifacts that are integrated into the graphical user interface, such as a colored border around the graphical user interface or icons displayed at known locations within the graphical user interface. In other embodiments, the physical frame of the display device 108, i.e., the material surrounding the display area of the display device 108, may be used in the ongoing calibration procedure.

Figure 8:
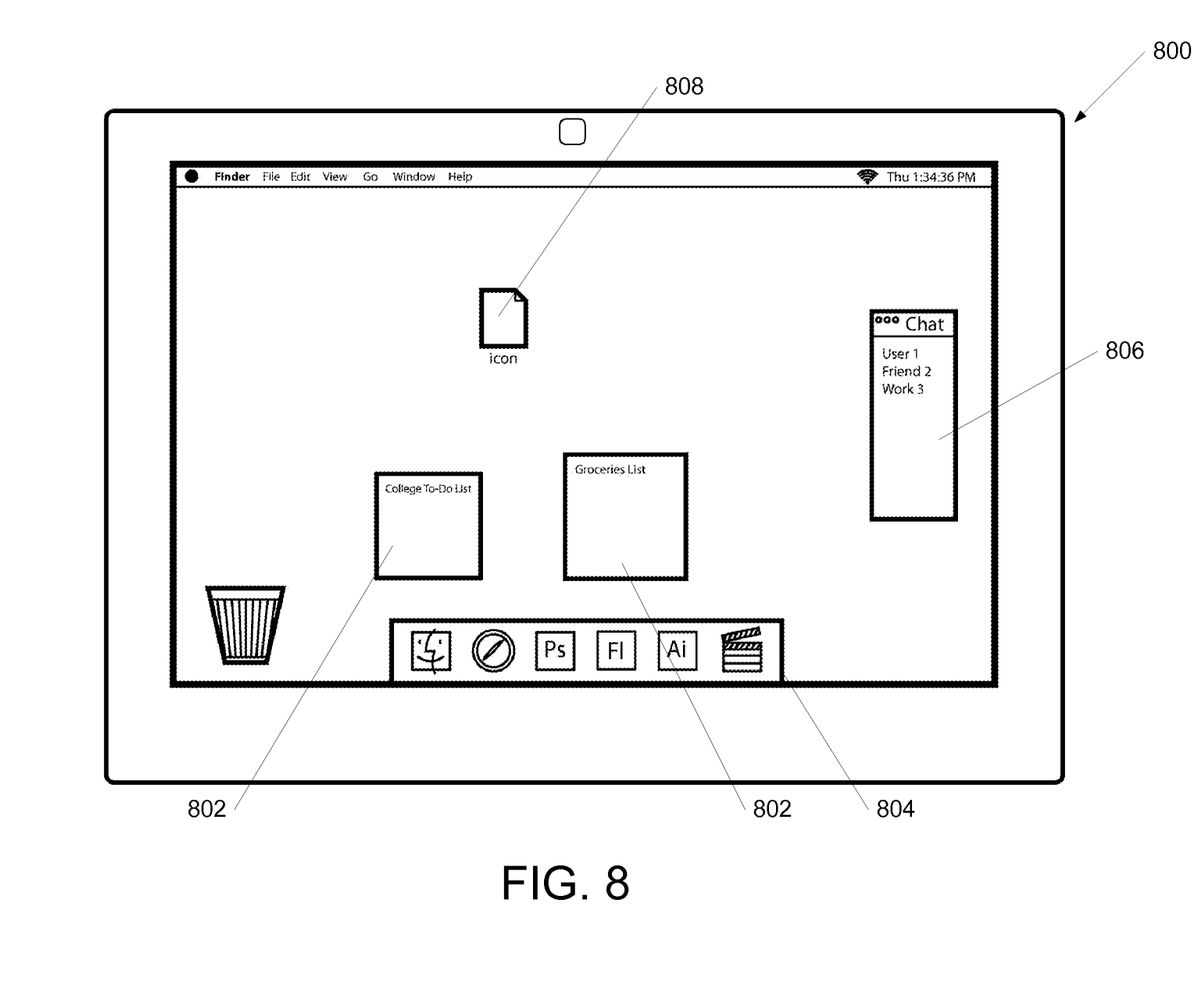
FIG. 8 illustrates an example graphical user interface for use in connection with the method of FIG. 7.

FIG. 8 illustrates an example graphical user interface 800 for use in connection with the method of FIG. 7. The graphical user interface 800 includes a number of user interface elements, such as, for example, notes 802, a task bar 804, a chat window 806, an icon 808, and various other elements. A user can interact with these elements in various ways, including, for example, selecting an icon, "double-clicking" an icon, dragging and dropping a window, or resizing a window.

Figure 9:
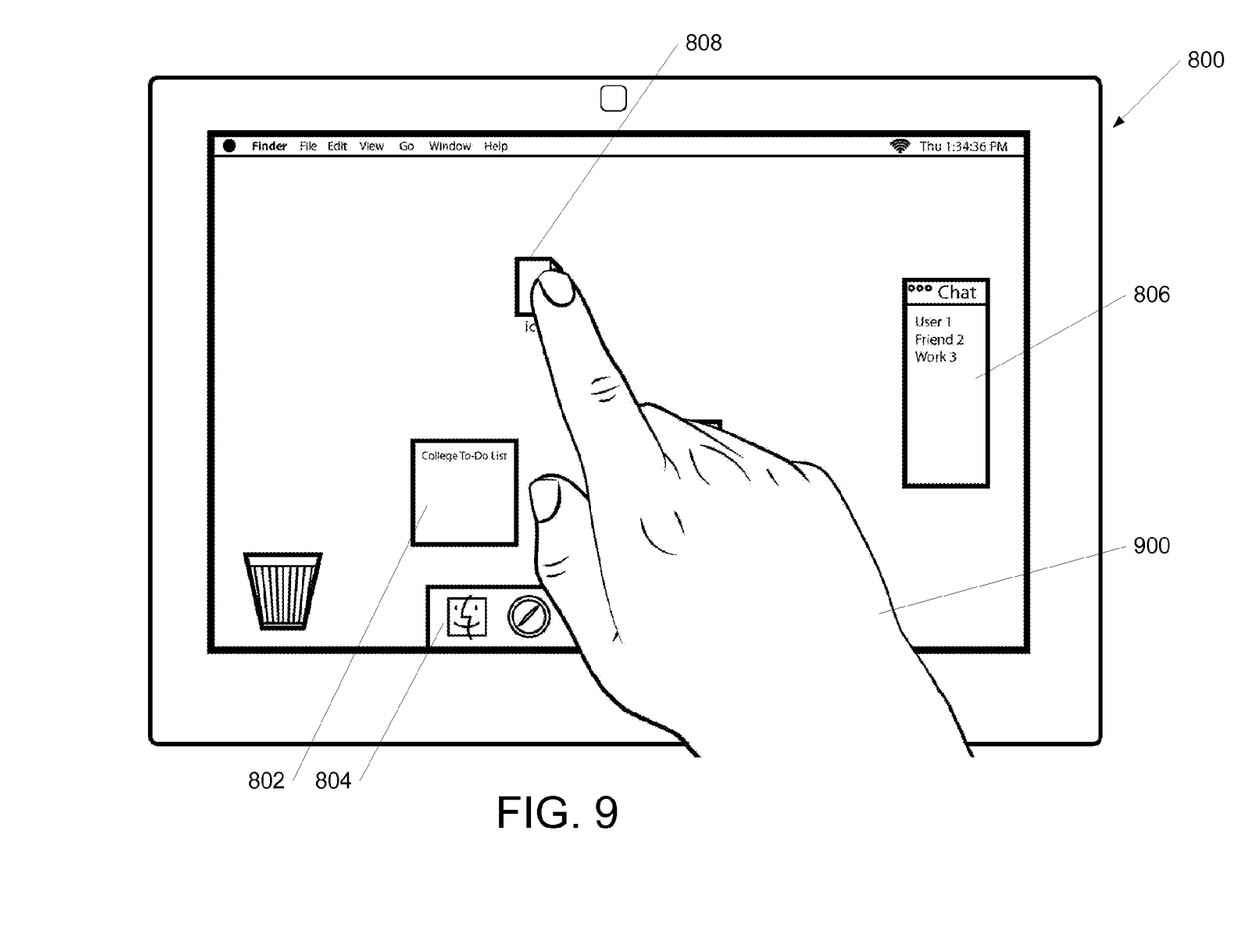
FIG. 9 illustrates superposition of a user's hand over the graphical user interface of FIG. 8.

FIG. 9 illustrates superposition of a user's hand 900 over the graphical user interface 800 of FIG. 8. The camera 200 captures the image of the graphical user interface 800 with the superimposed user's hand 900 as a camera feed and provides the camera feed to the computing device 106.

Figure 10:
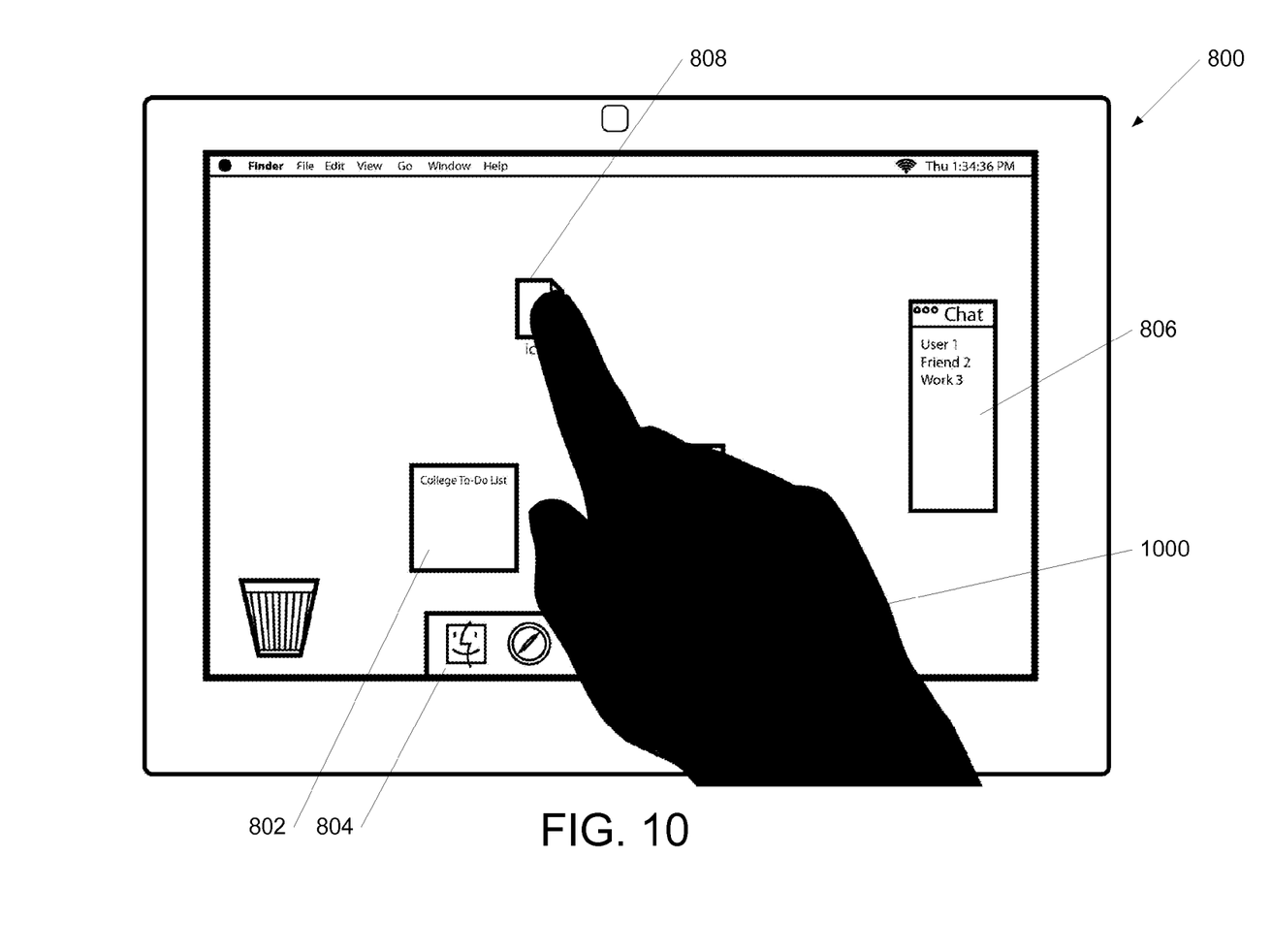
FIG. 10 illustrates detection of a user's hand as an obstruction according to the method of FIG. 7.

The computing device 106 compares the camera feed to the output feed that it sends to the display device 108. The output feed contains only the graphical user interface 800. Based on the camera feed and the output feed, the computing device 106 identifies portions of the camera feed that are not present in the output feed. The computing device 106 may identify such portions, e.g., the user's hand 900, as an obstruction, as shown in FIG. 10 at reference numeral 1000.

Figure 11:
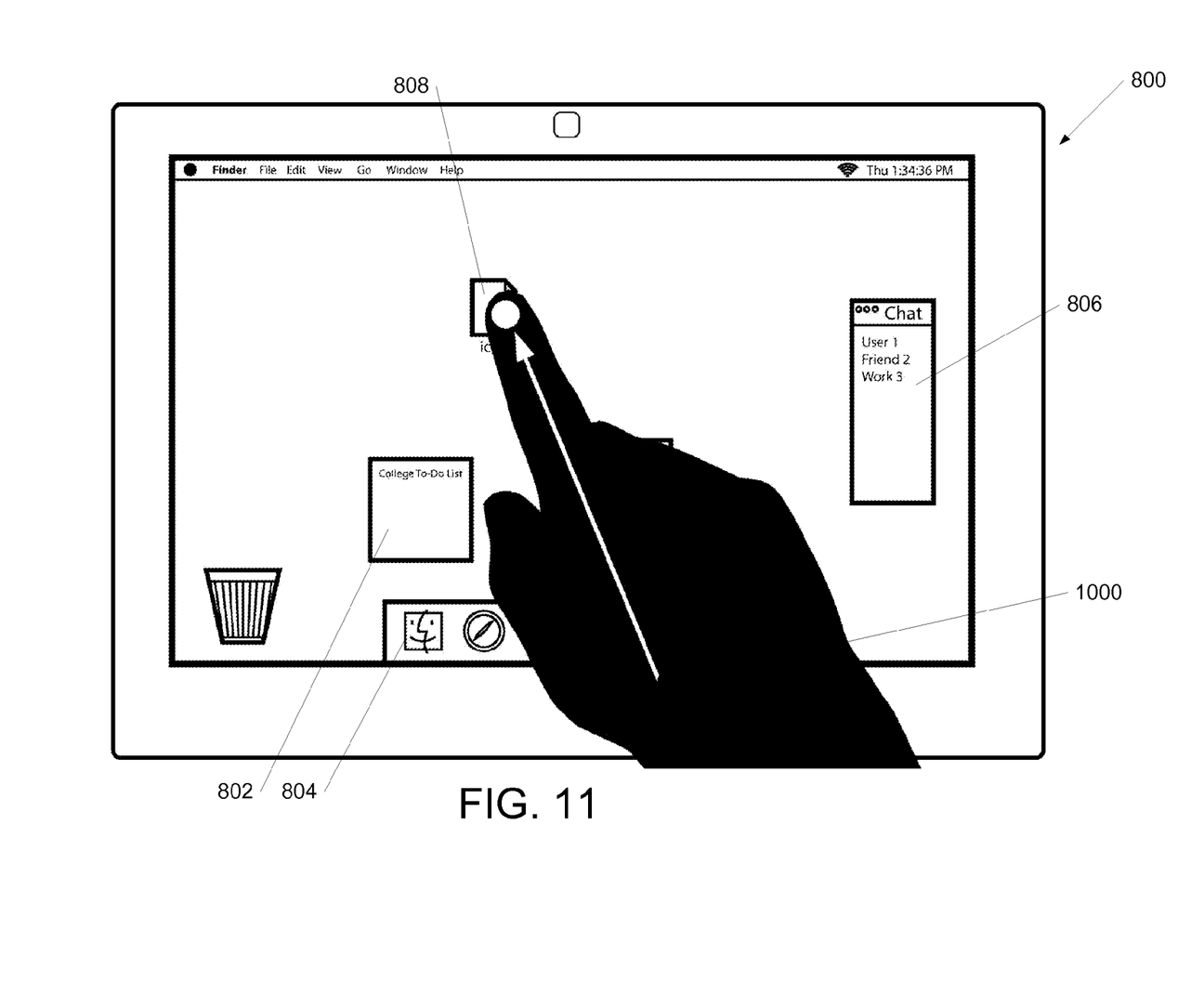
FIG. 11 illustrates a portion of the detected obstruction of FIG. 10 as being mapped to a selectable user interface element.

Further, the computing device 106 may identify a portion of the detected obstruction 1000. FIG. 11 illustrates the identified portion at reference numeral 1100. For example, the identified portion 1100 may be a user's index finger, as illustrated in FIG. 11. Alternatively, a different portion of the user's hand may be identified, such as a different finger. The identified portion 1100 is mapped to a selectable user interface element, such as the icon 808, as illustrated in FIG. 11. A user gesture may be mapped to a particular interaction with the selected user interface element, such as clicking, double-clicking, dragging, etc., based on the behavior of the obstruction 1000. For example, if the computing device 106 determines that the user's hand is "tapping" on the icon 808, either based on the camera feed or on data received from the accelerometer 300, the computing device 106 may determine that the user intends to click on the icon 808.

While certain embodiments have been described in the context of a two-dimensional graphical user interface, the principles disclosed herein can be applied to a three-dimensional graphical user interface. In a three-dimensional graphical user interface, the optical component 102 may have lenses having different polarizations. Alternatively, the optical component 102 may incorporate electronic components, such as liquid crystal elements, that electronically shutter or obscure the lenses in rapid succession, such that the display device 108 can send visual information to each eye independently. These conventional techniques allow the user to perceive a three-dimensional image, such as a three-dimensional graphical user interface. In addition to navigating the graphical user interface itself, the user can also manipulate three-dimensional objects that are in the graphical user interface. For example, the user can rotate such objects by performing rotation-like gestures with one or both hands. As a particular non-limiting example, a doctor can view a three-dimensional model of a patient's MRI and rotate, zoom in, separate parts, and isolate an area of interest. The doctor can then see more clearly the damage to a ligament, for example. As another example, a teacher can show a three-dimensional skeleton to a class and zoom in to the scapula to demonstrate that bone to the students. As yet another example, an architect can walk customers through a three-dimensional model of new house even before construction took place.

As demonstrated by the foregoing discussion, various embodiments may provide certain advantages, particularly in the context of navigating a graphical user interface. For example, the position capture input system facilitates navigating three-dimensional graphical user interfaces, which are difficult to navigate using a mouse or other conventional input devices.

It will be understood by those who practice the embodiments described herein and those skilled in the art that various modifications and improvements may be made without departing from the spirit and scope of the disclosed embodiments. The scope of protection afforded is to be determined solely by the claims and by the breadth of interpretation allowed by law.

What is claimed is:

1. A position capture input system comprising:
 a headworn device supportable on a head of a human user;
 a first camera located in the headworn device pointing forward and configured to capture an image of a field of view from a perspective of the user, wherein the first camera is viewing at least part of what the user is viewing; and
 a computing device in communication with the first camera and configured to:

perform a calibration process comprising displaying a calibration screen and receiving, from the first camera, a captured image of the calibration screen in the field of view from the perspective of the user, wherein the calibration process is performed on an ongoing basis to accommodate for the user changing perspective or moving;

display a graphical user interface, wherein the graphical user interface comprises a plurality of user interface elements;

receive, from the first camera, a captured image of the graphical user interface in the field of view from the perspective of the user;

compare the captured image of the graphical user interface to an image of the graphical user interface to detect an obstruction in the captured image of the graphical user interface;

map a position of the detected obstruction to a location in the graphical user interface using results obtained from the calibration process; and determine whether a user is interacting with one of the plurality of user interface elements of the graphical user interface based on the mapped position of the obstruction to the location in the graphical user interface.

2. The position capture input system of claim 1, further comprising an additional camera located in the headworn device separated from the first camera and in communication with the computing device and configured to capture an additional image of the graphical user interface from the perspective of the user and to provide the additional image to the computing device, wherein the user interacting with a user interface element of the graphical user interface can manipulate an object displayed in the graphical user interface to provide a perception of three-dimensional movement of the object.

3. The position capture input system of claim 1, further comprising a plurality of lenses supported on the headworn device to cover eyes of the user, the lenses being adapted to cause the displayed image to have a three-dimensional appearance.

4. The position capture input system of claim 1, further comprising at least one accelerometer in communication with the computing device, the accelerometer being wearable by the user on a limb of the user and configured to detect motion of the user's limb and to provide at least one signal to the computing device for sensing motion of the user's limb in at least one dimension, wherein the computing device is configured to determine whether the user is interacting with the one of the plurality of user interface elements of the graphical user interface based in part on the at least one signal without contacting the graphical user interface.

5. The position capture input system of claim 1, further comprising a haptic feedback module in communication with the computing device and configured to provide haptic feedback to the user when moving without contacting the graphical user interface.

6. The position capture input system of claim 1, wherein the calibration process determines scale and location of the graphic user interface relative to the forward looking direction of the first camera on the headworn device.

7. The position capture input system of claim 1, further comprising a monitor displaying the graphical user interface.

8. A method of processing user input received in a computing device, the method comprising:
in the computing device:
receiving captured images from a camera located in a headworn device supportable on a head of a human user, wherein the camera points forward and is configured to capture an image of a field of view from a perspective of the user and wherein the camera is viewing at least part of what the user is viewing;

performing a calibration process comprising displaying a calibration screen and receiving, from the camera, a captured image of the calibration screen in the field of view from the perspective of the user, wherein the calibration process is performed on an ongoing basis to accommodate for the user changing perspective or moving;

displaying a graphical user interface, wherein the graphical user interface comprises a plurality of user interface elements;

receiving, from the camera, a captured image of the graphical user interface in the field of view from the perspective of the user;

comparing the captured image of the graphical user interface to an image of the graphical user interface to detect an obstruction in the captured image of the graphical user interface;

mapping a position of the detected obstruction to a location in the graphical user interface using results obtained from the calibration process; and determining whether the user is interacting with one of the plurality of user interface elements of the graphical user interface based on the mapped position of the obstruction to the location in the graphical user interface.

9. The method of claim 8, further comprising moving a cursor to the location in the graphical user interface.

10. The method of claim 8, wherein the mapping a position of the detected obstruction to a location in the graphical user interface using results obtained from the calibration process is performed on an ongoing basis and comprises identifying a gesture.

11. The method of claim 8, further comprising mapping positions of multiple obstructions to the graphical user interface.

12. The method of claim 11, further comprising controlling a virtual keyboard displayed in the graphical user interface based on the mapped positions of the multiple obstructions to the graphical user interface.

13. The method of claim 8, further comprising receiving at least one signal from at least one accelerometer worn by the user on a limb of the user, the accelerometer being configured to detect motion of the user's limb in at least one dimension without having the user contact the graphical user interface.

14. The method of claim 8, further comprising providing haptic feedback to the user, without having the user contact the graphical user interface, via a haptic feedback module in communication with the computing device.

15. The method of claim 8, wherein the calibration process further comprises identifying scale and/or location of the graphical user interface on an ongoing basis.

16. The method of claim 8, wherein the calibration process further comprises producing a homography on an ongoing basis that allows for a direct comparison between pixels of the captured image of the graphical user interface and the displayed graphical user interface.

17. A non-transitory computer-readable storage medium storing computer-executable instructions that, when executed by a computing device, causes the computing device to perform a method comprising:

receiving captured images from a camera located in a head-worn device supportable on a head of a human user, wherein the camera points forward and is configured to capture an image of a field of view from a perspective of the user and wherein the camera is viewing at least part of what the user is viewing;

performing a calibration process comprising displaying a calibration screen and receiving, from the camera, a captured image of the calibration screen in the field of view from the perspective of the user, wherein the calibration process is performed on an ongoing basis to accommodate for the user changing perspective or moving;

displaying a graphical user interface, wherein the graphical user interface comprises a plurality of user interface elements;

receiving, from the camera, a captured image of the graphical user interface in the field of view from the perspective of the user;

comparing the captured image of the graphical user interface to an image of the graphical user interface to detect an obstruction in the captured image of the graphical user interface;

mapping a position of the detected obstruction to a location in the graphical user interface using results obtained from the calibration process; and determining whether the user is interacting with one of the plurality of user interface elements of the graphical user interface based on the mapped position of the obstruction to the location in the graphical user interface.

18. The computer-readable storage medium of claim 17, storing further computer-executable instructions for moving a cursor to the location in the graphical user interface.

19. The computer-readable storage medium of claim 17, storing further computer-executable instructions for mapping the position of the obstruction on an ongoing basis and for identifying a gesture.

20. The computer-readable storage medium of claim 17, storing further computer-executable instructions for mapping positions of multiple obstructions to the graphical user interface, and for controlling a virtual keyboard displayed in the graphical user interface based on the mapped positions of the multiple obstructions to the graphical user interface.

21. The computer-readable storage medium of claim 17, storing further computer-executable instructions for receiving at least one signal from at least one accelerometer corresponding to motion of the accelerometer in at least one dimension, the signal being processed to compute motion of the obstruction relative to the graphical user interface without having the obstruction contact the graphical user interface.

* * * * *